W. A. CHAPIN.
Broadcast-Seeder.
No. 18,439. Patented Oct 20, 1857.
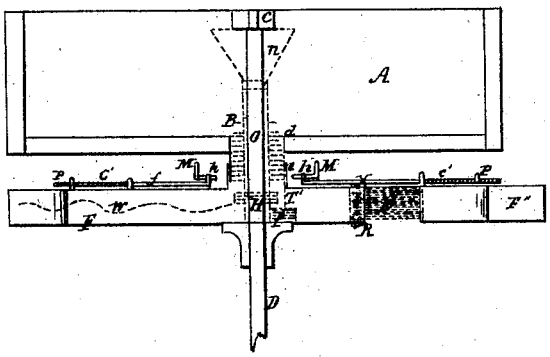
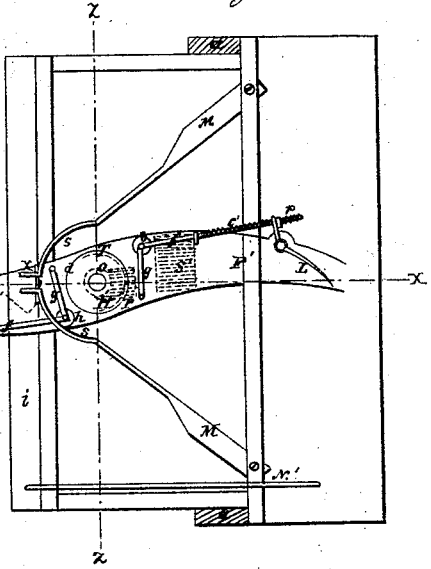
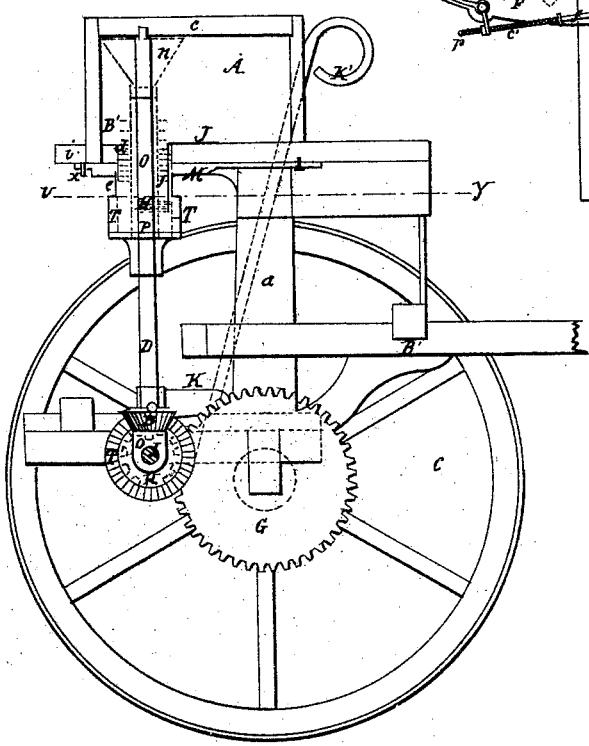
Witnesses:
Thomas L. Hall
Daniel Clark
Inventor:
William A. Chapin

UNITED STATES PATENT OFFICE.

WILLIAM A. CHAPIN, OF ST. JOHNSBURG, VERMONT.

IMPROVEMENT IN MACHINES FOR SOWING SEED BROADCAST.

Specification forming part of Letters Patent No. 18,439, dated October 20, 1857.

*To all whom it may concern:*

Be it known that I, WILLIAM A. CHAPIN, of St. Johnsburg, in the county of Caledonia and State of Vermont, have invented new and useful Improvements on Machines for Sowing Seed Broadcast; and I do hereby declare that the following is a full and exact description of the construction and operation of the same, reference being had to the annexed drawings, making a part of this specification, in which—

Figure 1 is a longitudinal vertical section. Fig. 2 is a horizontal section, taken through $v$ $y$, Fig. 1. Fig. 3 is a transverse vertical section of the hopper A, taken on the line $z$ $z$, and a longitudinal vertical section of the dispersing-tubes F F', taken through $x$ $x$, Fig. 2.

Similar letters of reference indicate corresponding parts in all the figures.

My invention consists in making the dispersing-tubes in two or more parts, so they can be lengthened or shortened, according as the specific gravities of the different kinds of seed to be sown at the same time may require, in order that they may all be sown over all the ground and leave no part where one kind of seed shall not reach, by reason of its less specific gravity, as far as another of greater specific gravity, the lighter being thrown with sufficiently greater force by passing through the lengthened tube, which, from its end revolving in a larger circle in the same time as the end of the short tube, has consequently greater centrifugal force, which will be imparted to whatever passes through it.

My invention further consists in introducing into the dispersing-tubes a shaker or agitator, which by suitable mechanism is caused to vibrate in such a manner as to prevent lime, ashes, salt, plaster, and such substances from clogging in the arms when they are being sown.

To enable those skilled in the art to make and use my invention, I will proceed to describe it.

A represents the hopper, which is supported by the uprights $a$ $a$, attached to the frame B of the machine. The frame B is supported by wheels $c$ $c$.

D represents a vertical shaft, which passes through the center of the hopper A. The lower end of the shaft is stepped in at $o$ on the frame B, as shown in Fig. 1, and the upper end of the shaft works in a cross-piece, C, on the upper part of the hopper.

The lower end of the shaft D has a bevel-wheel upon it, and also hollow arms or tubes F F', the shaft passing through the center of the arms or tubes. The arms or tubes are placed above the wheel E, and a tube, $d$, passes from the center of the hopper and within a flange, $e$, at the center of the arms or tubes. Thus it will be seen that the grain will pass from the hopper A through the tube $d$ into the hollow arms or tubes F F'.

To the inner side of one of the wheels $c$ there is attached a toothed wheel, G, into which a pinion, H, gears. This pinion is attached to one end of a shaft, I, which has a bevel-pinion, T, on its opposite end, the pinion T gearing into the bevel-wheel E on the shaft D. The outer bearing of the shaft I is in a lever, K, attached to the frame B.

To the outer ends of the tubes F F' there is pivoted a valve, L, as clearly shown in Fig. 2. These valves are kept closed by spiral springs $c'$, which are placed around rods $f$, attached to the back ends of the valves by nuts $p$. The rods $f$ are lengthened or shortened by means of nuts $p$, and connected by pivots to rods $g$, which are pivoted to the tubes F F'. The inner ends of the rods $f$ have friction-rollers $h$ attached to them.

To the under side of the hopper A there are pivoted two levers, M M, which have on their back ends curves S S, the ends of which pass into a loop, X, which is fastened to lever $i$, to which is attached a rod, N'.

N represents a secondary hopper, which communicates at the bottom with tube O, which surrounds shaft D. Tube O, at its lower end, is closed, and has a branch tube, P, which passes through a semi-hoop or partition, T', and opens into tube F'.

S' represents a slide in one of the tubes, F', constructed in our manner for extension, being made in two parts, so that one can slide into the other.

R represents a bolt for fastening the slide.

B' represents teeth on the outer and inner surfaces of tubes O and $d$.

J represents a stud passing down from the hopper (to which it is fastened) through a ring (shown at H) which surrounds the tube O.

To ring H is attached a rod, W, which has a number of short crooks in it, and extends into one of the tubes, F, nearly to the outer end.

The operation is as follows: As the machine is drawn along, the hollow arms or tubes F F' will be rotated by means of the gearing previously described, and the grain in the hopper A will pass down through the tube $d$ into the hollow arms or tubes F F', and will be thrown by centrifugal force out of their ends. The valves L are kept closed by the springs $c$ while the ends of the arms or tubes are passing around one-half of their revolution at the front of the machine; but as they perform the other half-revolution the friction-rollers $h$ pass into the curves S S on levers M M, which curves act as a cam, and the valves are thereby opened, and the seed or grain will be thrown out from the tubes F F' during the time they remain open, or one-half a revolution, and be sown broadcast behind the machine.

The quantity of seed or grain to be sown on a given area of ground is regulated by adjusting the length of the rods $f$ by means of the nuts $p$, so that the valves L may be opened more or less as they pass around from the front to the back of the machine.

When it is desired to sow more than one kind of seed at the same time, one kind, as wheat, is put into the hopper A, from which it will pass through tube $d$ into tube F and be sown, as described before, being prevented from passing into tube F' by the semi-hoop or partition T'. Another kind, as clover, may be put into hopper N, from whence it will pass by the tubes O and P into tube F' and be sown as before; but in order that the clover (if heavier than the wheat) may not be thrown farther than the wheat, the tube F may be shortened by means of the slide S' until both seeds will be thrown the same distance. If another seed is used which is lighter than wheat, the tube F' may be lengthened until the two seeds are thrown the same distance.

When sowing ashes, plaster, or any substance liable to clog in the tubes, they are first pulverized by passing between the teeth B on the tubes O and $d$, then prevented from caking in the tubes by the vibrations of the shaker W, which, being attached to the ring H, is caused to vibrate by the ring H being of less diameter than the circle described by the stud J, which, passing through it, causes the shaker W to vibrate back and forth once during each revolution of shaft D a distance equal to the difference in diameter of the ring H and the circle described by the stud J. The substances are thus kept in such agitation that they will pass through the tube F with great facility.

I disclaim the horizontal rotating arms or tubes, with their valves and adjustable cam; but

What I claim as new and useful, and desire to secure by Letters Patent, is—

The extension-tube F' and shaker W, when arranged substantially in the manner and for the purposes herein described.

WM. A. CHAPIN.

Witnesses:
THOMAS L. HALL,
DANIEL CLARK.